United States Patent [19] [11] 4,269,019
Strobel [45] May 26, 1981

[54] TEDDING ATTACHMENT FOR ROTARY HARVESTING MOWER

[75] Inventor: Gerhard Strobel, Ehingen, Fed. Rep. of Germany

[73] Assignee: Klöckner-Humboldt-Deutz AG, Gottmadingen, Fed. Rep. of Germany

[21] Appl. No.: 51,220

[22] Filed: Jun. 22, 1979

[30] Foreign Application Priority Data

Jun. 24, 1978 [DE] Fed. Rep. of Germany ....... 2827786

[51] Int. Cl.³ .......................................... A01D 57/30
[52] U.S. Cl. ..................................... 56/192; 56/13.6; 56/370
[58] Field of Search ................. 56/192, 370, 371, 372, 56/373, 374, 13.6, DIG. 1

[56] References Cited

U.S. PATENT DOCUMENTS

| 2,521,417 | 9/1950 | Sefcovic | 56/192 |
| 3,971,203 | 7/1976 | Lely | 56/370 |
| 4,030,275 | 6/1977 | Ruprecht | 56/192 |
| 4,094,132 | 6/1978 | Decoene et al. | 56/192 |
| 4,117,653 | 10/1978 | Tarver | 56/13.6 |
| 4,128,987 | 12/1978 | Zweegers | 56/370 |

FOREIGN PATENT DOCUMENTS 2838420 9/1978 Fed. Rep. of Germany ............ 56/13.6

Primary Examiner—Robert A. Hafer
Attorney, Agent, or Firm—Karl F. Ross

[57] ABSTRACT

A rotary mower has a plurality of upright mowing drums rotatable about respective vertical axes and each having a lower end provided with a plurality of radially outwardly extending blades forming blade orbits on rotation of the drum. Attached to each drum above the respective blades is a multipart ring carrying a plurality of pairs of outwardly directed spring-steel tines. These tines catch crop cut by the blades and project it backwardly behind the mower to ted this crop.

14 Claims, 8 Drawing Figures

TEDDING ATTACHMENT FOR ROTARY HARVESTING MOWER

FIELD OF THE INVENTION

The present invention relates to an improvement in a rotary harvesting mower. More particularly this invention concerns a tedding attachment for such a mower.

BACKGROUND OF THE INVENTION

A standard rotary mower used for harvesting a field crop such as hay or alfalfa has a plurality of upright drums each centered on and rotated about an upright axis, and each carrying at its lower end a plurality of radially outwardly directed blades. The drums are rotated to orbit the blades and cut the crop adjacent the ground.

In order to prevent the cut crop from jamming up in front of such a mower and to ensure that the crop dries uniformly, it is known to provide a tedding attachment for each of the mower drums. The most typical such attachment is formed as several synthetic-resin rubber flaps attached to the drum and extending radially therefrom. These flaps engage and fan the crop back behind the mower.

Such an arrangement has several disadvantages. The flaps create a considerable air current which is capable of flattening the crop immediately ahead of the mower, making mowing extremely difficult. The wind resistance of these tedding flaps creates an additional load for the drive motor for such a mover, representing a considerable waste of energy since little useful work is done by these flaps. Finally the flaps, which must be flexible to prevent them from damaging the crop and for safety reasons, wear out rapidly and must, therefore, be replaced frequently.

OBJECTS OF THE INVENTION

It is therefore an object of the present invention to provide an improved tedding attachment for a rotary mower.

Another object is to provide such an attachment which overcomes the above-given disadvantages, that is which does not create an air current ahead of the mower, which adds little extra load to the drive motor for the mower, and which has a long service life.

Another object is to provide such an attachment which can readily be retrofitted on an existing rotary mower and which can easily be adjusted for particular operating circumstances, and which can even be taken out of operative position without being removed from the mower.

SUMMARY OF THE INVENTION

These objects are attained according to the instant invention in a mowing machine of the above-described general type and having a spreader or tedder comprising at least one set of radially extending tines secured to the mower drum above the blades for joint rotation therewith. According to this invention each set of tines is formed by a U-shaped wire element having a pair of legs constituting the tines and formed of an elastically deformable metal, normally a relatively springy steel.

The wind resistance of such a crop spreader is extremely small, yet when placed immediately above the mower blades, it will ensure good backward displacement of the cut crop with little damage to it. The springy tines have an extremely long service life, and even if they do have to be replaced, such replacement will be relatively inexpensive.

According to further features of this invention a plurality of such pairs of tines is mounted on each mower drum, with the pairs of tines angularly equispaced about each drum. The crop spreader according to this invention may additionally comprise a multipart ring, having a number of parts equal to the number of sets of tines. Thus when two tines are used two semicircular ring parts are joined together by bolts at the tines to secure the assembly snugly on the outside of the drum. This arrangement makes it therefore very easy to retrofit a mower with the tedder according to this invention, and makes it relatively easy to adjust the height of the tedder on its drum simply by loosening the holding screws and moving the ring vertically.

It is also possible according to this invention to bend the ends of the tines. They may be bent forwardly into or backwardly from the rotation direction of the respective drum and can similarly be bent up or down, depending on the type of crop being acted upon.

Furthermore, according to the present invention it is possible to loosen the attachment bolts for a given pair of tines and swing it into a position parallel to and immediately adjacent the respective drum, then retighten the attachment bolt. In this position the tines lie closely radially against the drum and are completely out of the way if their use is not needed.

SPECIFIC DESCRIPTION

Figure 2:
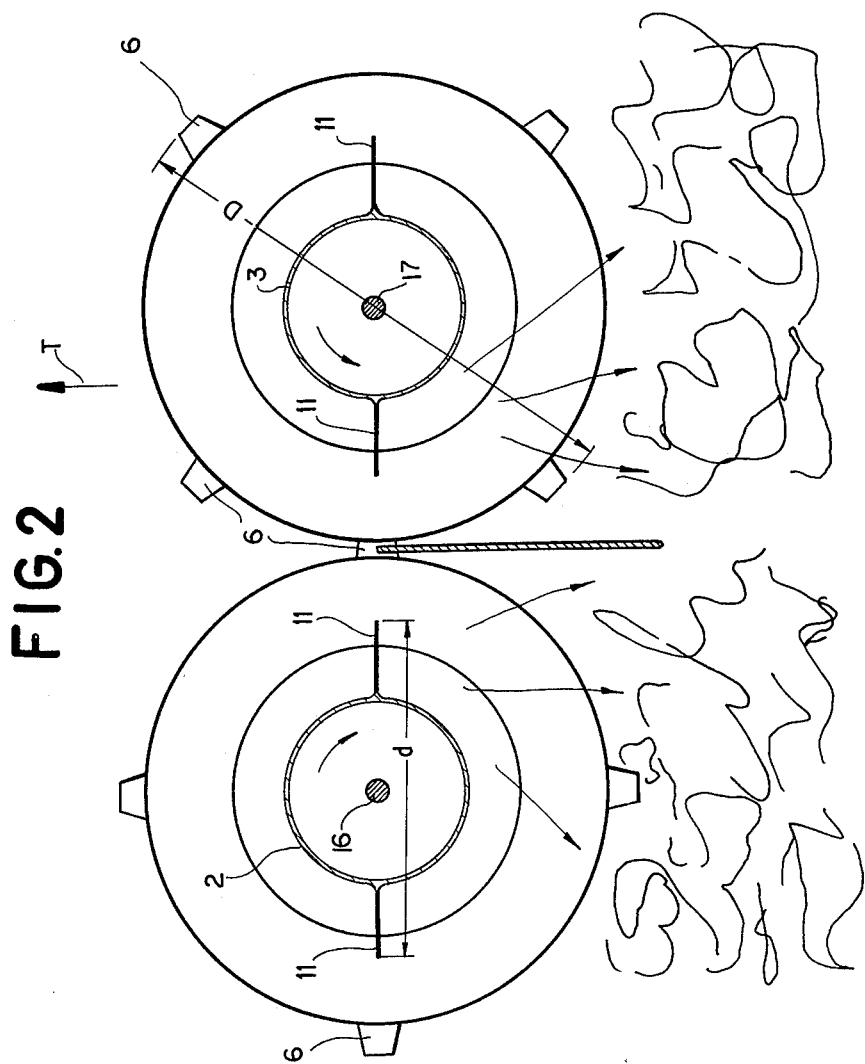
FIG. 2 is a section taken along line II—II of FIG. 1.

A mower according to the instant invention has a frame 1 adapted to travel along the ground in a horizontal travel direction T (FIG. 2). This frame 1 carries a pair of mowing drums 2 and 3 having respective downwardly flared skirts 4 and 5 each carrying a plurality of short blades 6. The drums 2 and 3 rotate about parallel vertical axis A and are normally counterrotated as indicated by the arrows in FIG. 3 so that they move backwardly at their closest portions. The frame 1 carries a pair of vertical shafts 16 and 17 centered on the axes A in the drums 2 and 3 and carrying on their lower ends slide disks or shoes 7 and 8 that ride on the ground and keep the blades 6 slightly above the ground. A vertical plate 10 is connected to the frame 1 and extends down between and behind the two drums 2 and 3.

Figure 3:
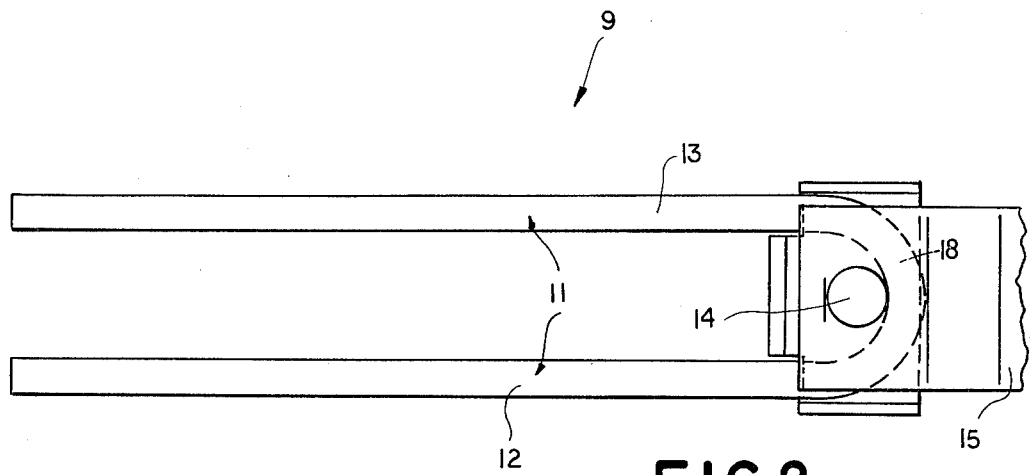
FIGS. 3, 3A and 3B are side views of tines according to this invention.
Figure 4:
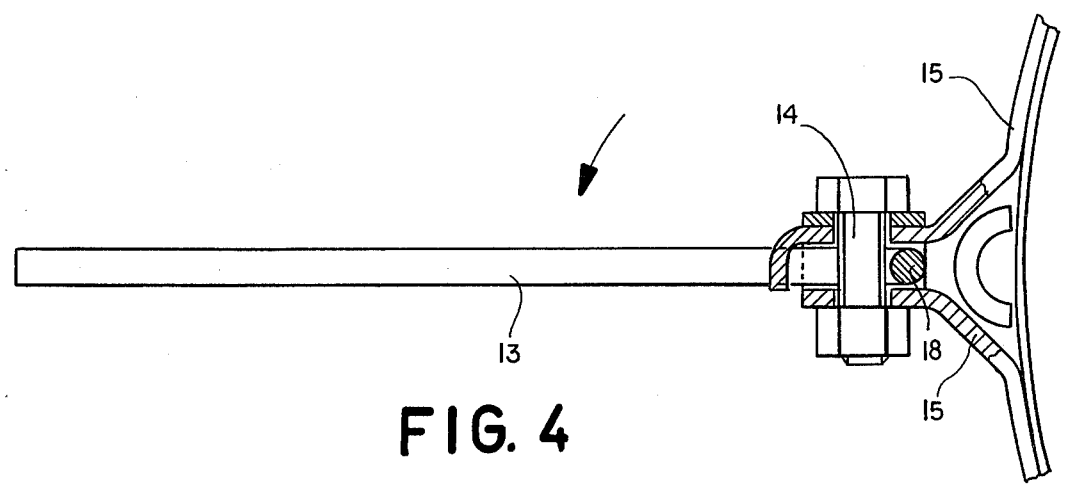
FIGS. 4, 4A and 4B are top views of tines according to this invention.

Each drum 2 and 3 carries a tedding attachment 9 shown in best detail in FIGS. 3 and 4. Each such tedding attachment 9 comprises a U-shaped spring-steel wire 11 having a pair of parallel legs 12 and 13 extending one above the other and lying in a plane including the respective axis A. A bight 18 interconnects the two legs 12 and 13 of each U-shaped wire 11 and is held in place by a bolt 14 that clamps this bight 18 of the U-shaped wire 11 between the ends of a pair of semicircular elements 15 together forming a ring that fits snugly around the respective drum 2 or 3. As best seen on FIG. 2 the two U-shaped wires 11 lie on a diametral plane of the respective axis A. In addition they are angularly so positioned that they are all coplanar in one angular position of the two drums 2 and 3, which are counter-rotated synchronously.

Figure 1:
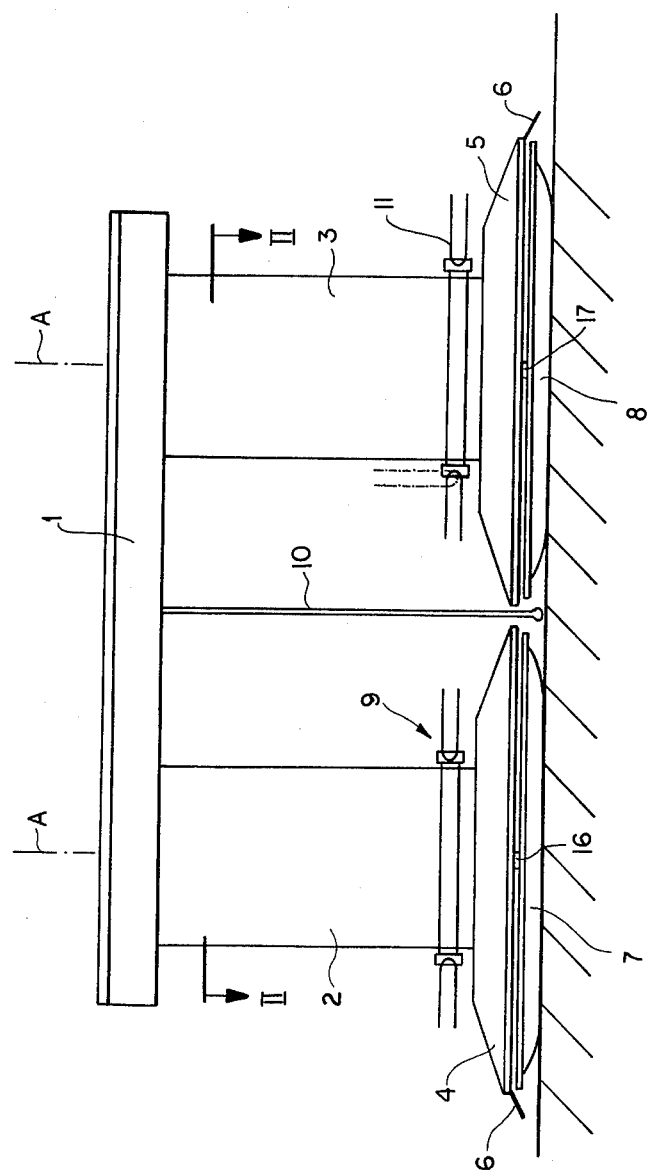
FIG. 1 is a front view of rotary mower according to the instant invention.

It is possible as shown in FIG. 1 in dot-dash lines to loosen the bolt 14 for any of the U-shaped wires 11 and rotate same up into an upright position parallel to the respective axis A and lying against the respective drum. In this position the bolt 14 can again be tightened to lock the respective wire in place. Loosening of any of the bolts 14 also allows the respective ring formed by the ring halves 15 to be displaced axially along the respective drum 2 or 3.

Figure 3A:
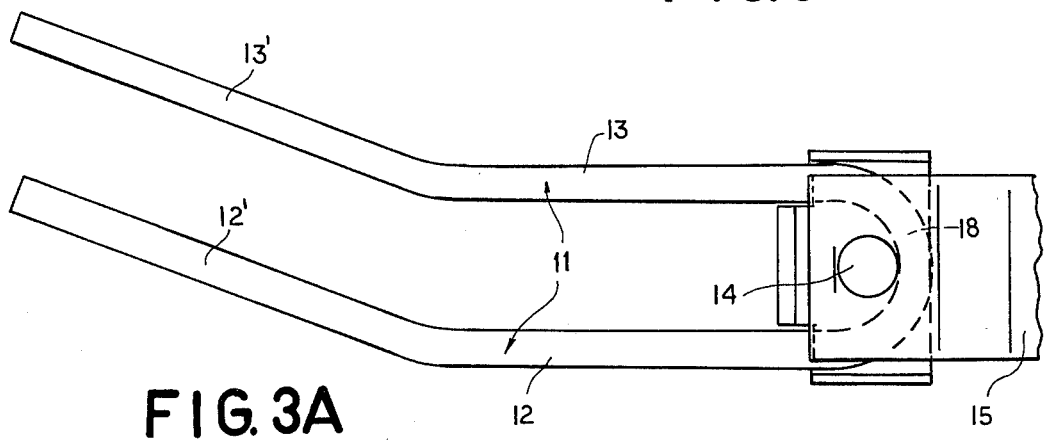
Figure 3B:
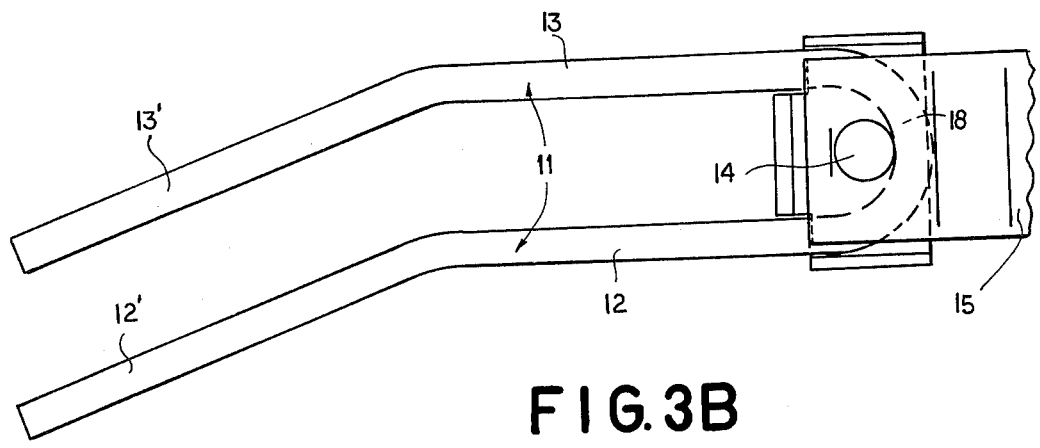

It is possible as shown in FIG. 3A, to bend the end portions 12' and 13' of the legs 12 and 13 up so as to best catch and hold a relatively tall crop. Similarly if the crop is relatively short it is possible as shown in FIG. 3B to bend the tips 12' and 13' down. Such bending-down would normally be to an extent equal to the flare angle of the frustoconical portion of the respective skirt 4 or 5. Similarly the location of the bend would be directly above that point where the skirt 4 begins to bend downwardly from its planar portion.

Figure 4A:
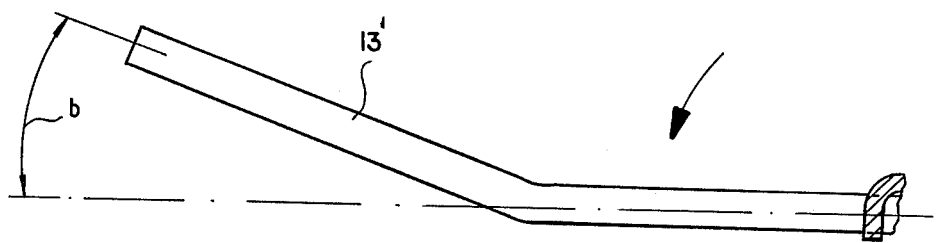
Figure 4B:
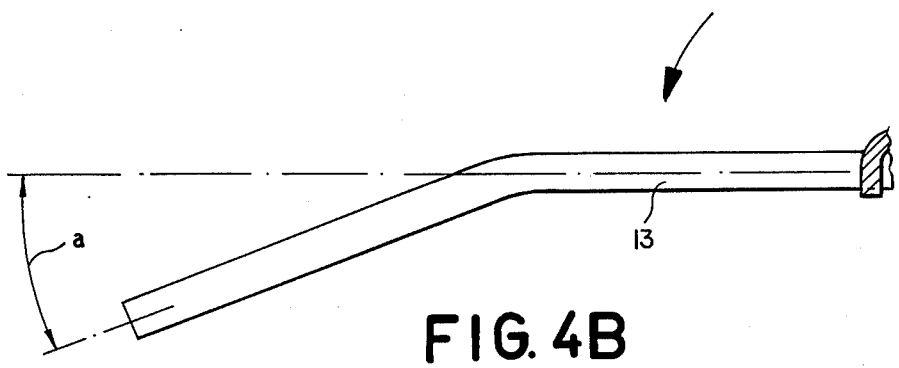

FIG. 4A shows that it is possible to bend the tips 12' and 13' backwardly in the rotation direction through an angle b equal to between 0° and 40°. Similarly it is possible as shown in FIG. 4 to bend them forwardly to an angle a equal to between 0° and 20°. The bending backward or forward depends on the type of crop.

Finally as seen in FIG. 2 the tines 11 define a relatively small diameter d which is considerably smaller than the diameter of the orbits defined by the blades 6. The ratio of d to D can vary between 2:3 and 2:1.

We claim:

1. In a mowing machine having at least one upright mowing drum centered on and rotatable about an upright axis and having a lower end provided with at least one radially projecting blade defining a blade orbit on rotation of said drum, a crop spreader comprising:
    a ring surrounding said drum above said blade and having a pair of ends;
    means for tightening said ring to said drum for joint rotation therewith; and
    at least one set of radially extending tines having inner ends clamped between said ends of said ring above said blade for joint rotation therewith and with said drum.

2. The crop spreader defined in claim 1 wherein each set is formed by a U-shaped wire element having a pair of legs constituting said tines and formed of an elastically deformable metal.

3. The crop spreader defined in claim 2 wherein each of said tines has a main portion extending substantially radially of said axis and a tip inclined to the respective main portion.

4. The crop spreader defined in claim 3 wherein said tips are inclined into the direction of rotation by between 0° and 20°.

5. The crop spreader defined in claim 3 wherein said tips are inclined back in the direction of rotation by between 0° and 40°.

6. The crop spreader defined in claim 3 wherein said drum is provided at said blade with a downwardly flared skirt centered on said axis, said tips being generally parallel to said skirt.

7. The crop spreader defined in claim 3 wherein said tips are upwardly bent.

8. The crop spreader defined in claim 1 wherein a plurality of such sets is provided on said drum with said sets generally angularly equispaced.

9. The crop spreader defined in claim 1 wherein two such sets are provided on said drum.

10. The crop spreader defined in claim 1 wherein two such sets are provided on said drum generally diametrically apart, said ring having a pair of halves each having a pair of such ends, said sets being secured to said rings at said ring ends.

11. The crop spreader defined in claim 1, wherein said means is loosenable and said ring is axially displaceable along said drum when said ring is loosened.

12. The crop spreader defined in claim 1 wherein said tines are displaceable on said drum into a position generally parallel to said axis and closely radially juxtaposed with said drum.

13. The crop spreader defined in claim 12, further comprising means for securing said tines in said position.

14. The crop spreader defined in claim 1 wherein said tines have ends defining a tine orbit having a tine-orbit diameter forming a ratio with the diameter of said blade orbit of between 2:1 and 2:3.

* * * * *